(12) United States Patent
Thörn et al.

(10) Patent No.: US 9,760,779 B2
(45) Date of Patent: Sep. 12, 2017

(54) GENERATING TRAJECTORY DATA FOR VIDEO DATA

(71) Applicant: Sony Corporation, Tokyo (JP)

(72) Inventors: Ola Thörn, Limhamn (SE);
Pär-Anders Aronsson, Malmö (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/127,061

(22) PCT Filed: Mar. 20, 2014

(86) PCT No.: PCT/IB2014/059986
§ 371 (c)(1),
(2) Date: Sep. 19, 2016

(87) PCT Pub. No.: WO2015/140598
PCT Pub. Date: Sep. 24, 2015

(65) Prior Publication Data
US 2017/0109587 A1    Apr. 20, 2017

(51) Int. Cl.
*H04N 9/80* (2006.01)
*G06K 9/00* (2006.01)
*G11B 27/34* (2006.01)
*G11B 27/11* (2006.01)
*G06T 7/246* (2017.01)
*G11B 27/00* (2006.01)

(52) U.S. Cl.
CPC ..... *G06K 9/00744* (2013.01); *G06K 9/00604* (2013.01); *G06T 7/248* (2017.01); *G11B 27/005* (2013.01); *G11B 27/11* (2013.01); *G11B 27/34* (2013.01); *G06T 2207/30241* (2013.01)

(58) Field of Classification Search
CPC .......... G06K 9/00744; G06K 9/00604; G11B 27/34; G11B 27/11; G11B 27/005; G06T 7/248; G06T 2207/30241
USPC ........ 386/239, 224, 223, 228, 241, 248, 246
See application file for complete search history.

(56) References Cited

U.S. PATENT DOCUMENTS

2012/0033855 A1* 2/2012 Ryan ..................... G06T 7/20
382/103
2015/0355815 A1* 12/2015 Palti-Wasserman .... G06F 3/013
715/835

FOREIGN PATENT DOCUMENTS

EP        2562684 A2    2/2013

OTHER PUBLICATIONS

Kimpber, D. et al., "Trailblazing: Video Playback Control by Direct Object Manipulation", ICME 2007, Jan. 1, 2007, pp. 1014-1018, IEEE.
Urruty, T., et al., "Detecting Eye Fixations by Projection Clustering", ACM Transactions on Multimedia Computing, Communications and Applications, vol. 3, No. 4, Article 23, Dec. 1, 2007, pp. 23:1-23:20.

* cited by examiner

*Primary Examiner* — Robert Chevalier
(74) *Attorney, Agent, or Firm* — Coats & Bennett, PLLC

(57) ABSTRACT

The present invention relates to a method for generating trajectory data for video data. According to the method, an eye movement of an eye (11) of a viewer (10) viewing moving visual images is captured with a capturing device (14). The trajectory data (32) is automatically determined based on the eye movement with a processing device (15) and the trajectory data (32) is automatically assigned to the video data comprising the moving visual images.

11 Claims, 3 Drawing Sheets

[Fig. 1]
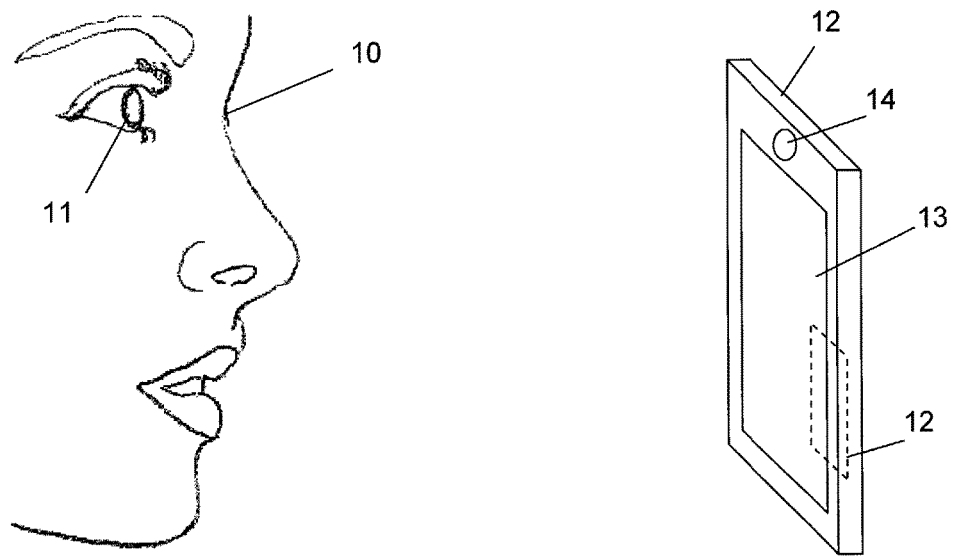
[Fig. 2]
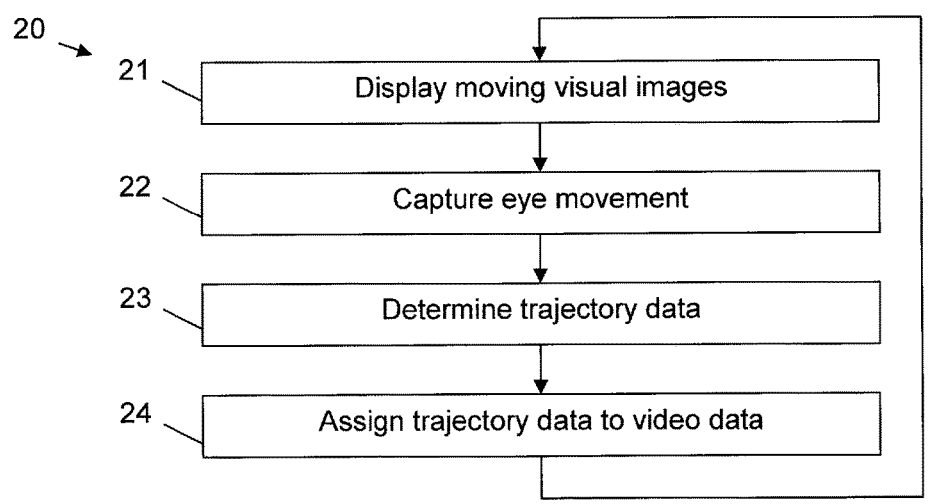

[Fig. 3]
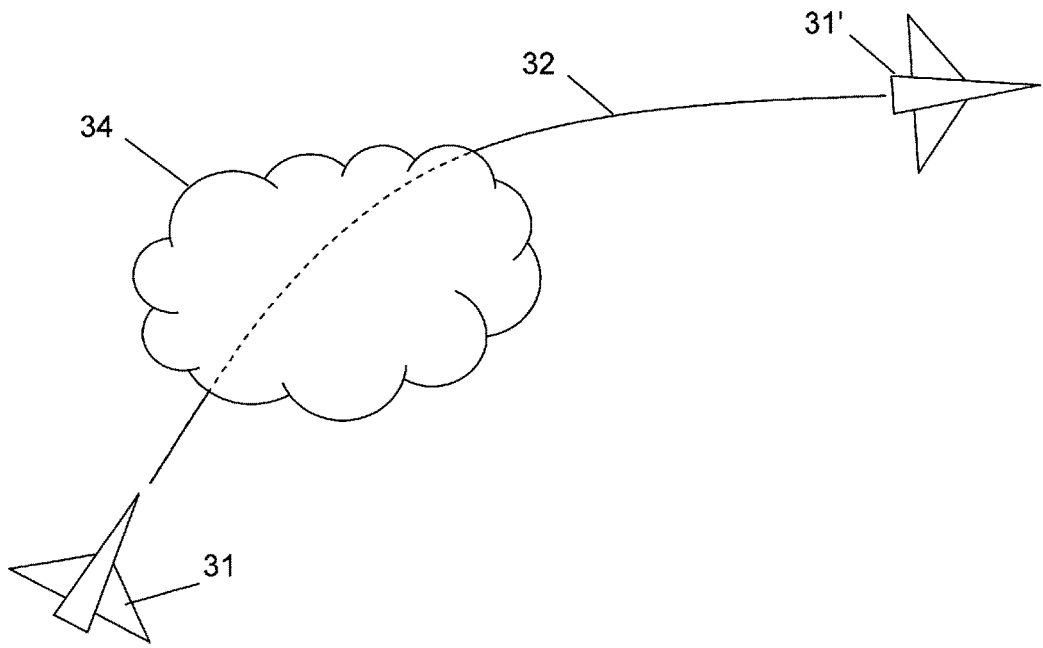
[Fig. 4]
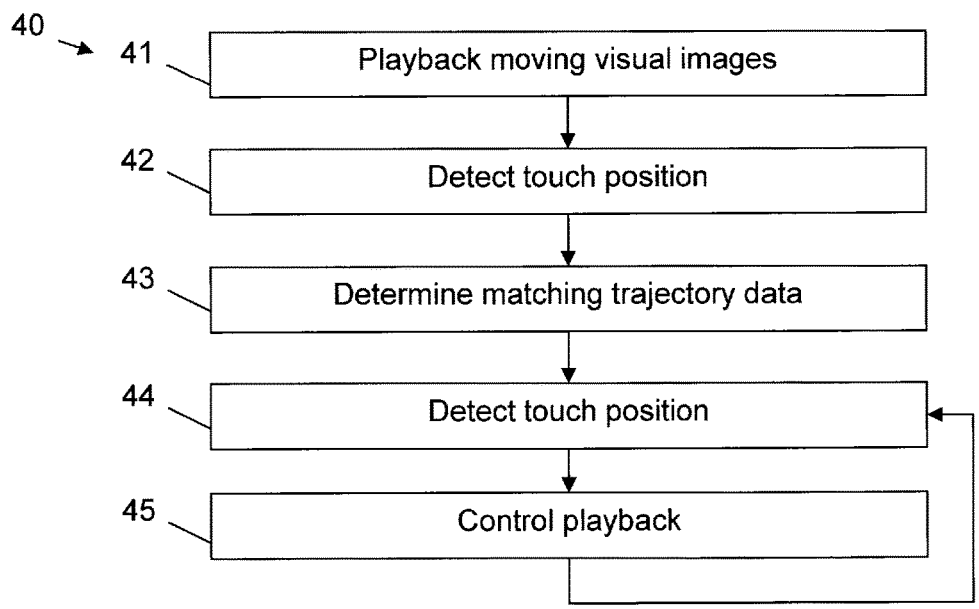

[Fig. 5]
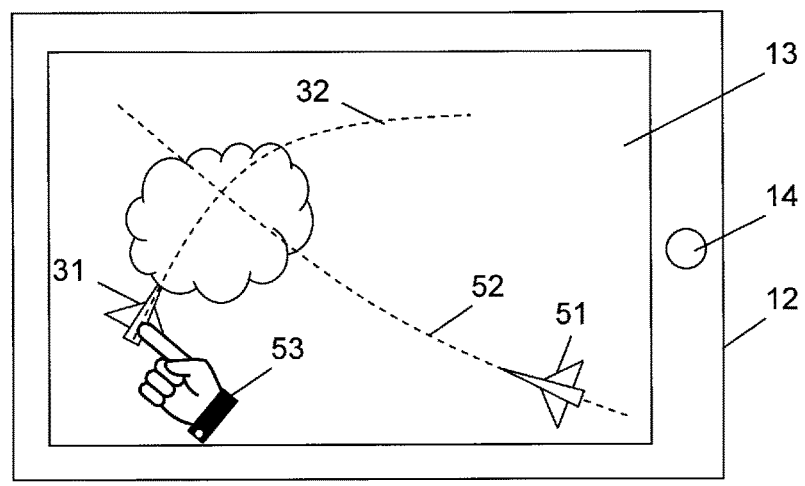

GENERATING TRAJECTORY DATA FOR VIDEO DATA

TECHNICAL FIELD

The present invention relates to a method for generating trajectory data for video data. Especially, the present invention relates to a method for generating trajectory data based on gaze tracking thus avoiding computational effort in image processing. The present invention relates furthermore to a user equipment, for example a mobile telephone, implementing the method.

BACKGROUND ART

In many applications, a determination of a movement of an object in video information, a so-called trajectory of the object, may be useful or required. For example, as an alternative to the most common time-based playback control of a video, a direct object manipulation may be used in which a user directly controls the movement of an object within the video for navigating within the video. For example, the user may track an object along its motion trajectory and the speed of the track movement determines the speed of the playback. This direct object based playback control may have several consequences for the user, for example the user may get direct control over the movements in a scene and enables the user to skip large parts of a video where the object of interest does not move. In order to realize such a direct object manipulation there is a need to know where an object is arranged or located in the different frames of the video. Many different object-tracking algorithms are existing, for example the so-called optic flow algorithm. Furthermore, a lot of algorithms are existing for estimating or guessing where an object is arranged in the presence of an occlusion, for example using motion predictions, colour matching, form matching and so on. However, object tracking algorithms based on processing of images of the video data may require huge amounts of processing power or may require large processing times. Furthermore, there may be technical problems that may hamper a satisfying user experience in connection with the above-described direct object manipulation. One of these problems is for example, when the object and thus also the motion path of the object is occluded at some times by other objects.

For example, when a user is watching a video of a football match, the user may want to navigate within the video by using the direct object manipulation and may therefore track a certain player or the ball along the corresponding motion trajectory. For example, the video may show a specific football player running and dribbling with the ball, and several other football players trying to get the ball. In this case, the other football players may partly occlude the specific football player and the ball leading to difficulties to automatically estimate the position of the ball and the specific football player with a high reliability. The result may be that the path of the ball and/or the specific football player may be cut up in several smaller paths or the tracking of the path is lost for some time. Another problem may be that two different not related paths are wrongfully joined due to an incorrect object tracking. Another problem may arise when to many object paths are present. For example, the video may comprise a crowd of marathon runners and the user wants to control the playback of the video by directly manipulating a specific runner, for example by tracking the runner's face using a touch-sensitive display on which the video data is played back. However, there is a lot of movement within the video and there are a lot of runners. The resolution and distance to the runners may make it difficult to use a face recognition algorithm to determine a path for each runner.

Therefore, there is a need for an improved method for determining motion trajectory in video data.

SUMMARY

According to the present invention, this object is achieved by a method for generating trajectory data for video data as defined in claim 1 and a user equipment as defined in claim 10. The dependent claims define preferred and advantageous embodiments of the invention.

According to an aspect of the present invention, a method for generating trajectory data for video data as provided. According to the method, an eye-movement of an eye of a viewer viewing moving visual images is captured with a capturing device. The capturing device may comprise for example a camera arranged adjacent to a display device on which the moving visual images are displayed to be viewed by the viewer. Based on the eye movement the trajectory data is automatically determined with a processing device evaluating images of the eye movement captured with the capturing device. A processing device automatically assigns a trajectory data to the video data comprising the moving visual images. In detail, the trajectory data may be automatically assigned to metadata of the video data. The trajectory data may comprise for example a plurality of position information over time and each position information may relate to a position of a moving object represented by the moving visual images. In other words, an eye movement of the viewer or a gaze of the viewer is analyzed to determine trajectory data. The trajectory data is recorded as metadata and may be used to find objects and paths in which the viewer was interested during viewing the video data.

Human beings have a remarkable accuracy when following objects even in complex situations comprising for example object occlusions. Therefore, trajectories of objects shown in the video data may be derived with high accuracy from the eye movement.

In principle, there are two kinds of two distinct eye movements conducted by a human being. The first kind is called saccade, where the eye moves from one point to another point in small jumps and stops at each point. During the jumps the eye is essentially blind, although this is not experienced as missing frames or images are rendered by the brain with corresponding intermediate frames or images. Then, when the eye stops at a position, new frames or images are received. The other kind of eye movement is called smooth pursuit in which the eye moves in a smooth continuous trajectory following an object in motion. By using the eye movement for generating trajectory data, the use of an object tracking algorithm based on image processing of the video data may be avoided. Since the smooth pursuit can not be voluntary triggered, it requires that the viewer either has an object to follow or that the viewer is following an object that may be occluded along partial parts of the moving path. Therefore, when for example a smooth pursuit is detected, the gaze path may be tracking an object potentially with occlusion handling and may be therefore accurately describe trajectory data of a moving object in the video data. Consequently, there is no need to perform a computationally expensive object tracking algorithm. This may be advantageous especially in the light of high definition videos.

According to an embodiment, at least a first position information and a second position information of a pointing device guided by a user during playback of the video data are determined. Each position information indicates a corresponding position in the moving visual images. The determined first and second position information are compared with the plurality of position information of the trajectory data. A parameter of an application playing back the video data is controlled based on the comparison. For example, a playback speed for playing back the video data may be adapted based on the comparison. In other words, a user watching the video data may specify a path on for example a touch-sensitive display with a finger or another pointing device during video playback. The specified path containing at least the first and second position is compared with the trajectory data stored as a metadata along with the video data. When trajectory data matching the specified path is found, the video playback or another function of an application playing back the video data may be controlled by the user touching the touch sensitive display along the trajectory.

According to another embodiment, at least a first position information and a second position information of a pointing device guided by a user are determined during playback of the video data. Each position information indicates a corresponding position in the moving visual images. The determined at least first and second position information are compared with a plurality of position information of the trajectory data. Based on the comparison an object in the moving visual images is determined. The at least first and second position information determined from the user pointing at an object may comprise for example small parts of a path the object is going to make in the next images of the video data. By comparing this small part of a path of the object with trajectory data which has been previously stored as metadata based on eye movements of other users having viewed the video data, a trajectory of the object may be determined. This information may be used to identify the object in the moving visual images. Therefore, the above-described method may be used in combination with a traditional image-based object detection algorithm and may support the traditional image-based object detection by providing the trajectory of the object to be identified. This may especially be helpful in cases in which the object to be identified changes its look. For example, the moving object is a flying bird. The trajectory data assigned to the video data is based on the eye movement of the viewer viewing the video. For a human being it is an easy task the follow the bird even when the wings flap and the look of the bird changes radically. However, an image-based tracking algorithm may run into problems due to the changing look of the moving object. By combining an image-based tracking algorithm with the trajectory data based on an eye movement, a more reliable object tracking may be accomplished.

According to another embodiment, a position of an object in the moving visual images may be determined by a traditional image processing of the moving visual images. The position of the object is compared with the plurality of position information of the trajectory data and a trajectory of the object is determined based on the comparison. Hence, the traditional image-processing may be combined with the trajectory data based on the eye movement to determine a movement of an object within the moving visual images. The traditional image processing is used to determine the object and a starting point of a movement of the object. Then, based on the starting point the trajectory data may deliver a trajectory of the determined object.

According to another embodiment, a plurality of eye movements are determined and for each of the plurality of eye movements is determined if the eye movement is a smooth pursuit eye movement or a saccade eye movement. In case the eye movement is a saccade eye movement, for each saccade eye movement an object located at a stop position of the corresponding saccade eye movement is determined and the trajectory data is determined based on the plurality of saccade eye movements and the related objects at the stop positions. Thus, background information in which the viewer was not interested during viewing the video data can be easily distinguished from objects of interest. Therefore, only the objects of interest at the stop positions of the saccade eye movements may be furthermore processed to determine trajectory data of the objects of interest. In case the eye movement is a smooth pursuit eye movement, the trajectory data may be determined directly based on the trajectory data of a continuous movement of the smooth pursuit eye movement.

According to another embodiment, a scene in an environment is captured with a first capturing device to generate the moving visual images. The moving visual images are displayed on a display device during capturing, and the eye movement of the eye of the viewer viewing the moving visual images is captured with a second capturing device arranged adjacent to the display device. The video data is generated based on the captured moving visual images and the trajectory data is determined based on the eye movement and assigned to the video data. In other words, already during recording video data, the trajectory data may be automatically determined and assigned to the video data. For example, when a user of a video camera or a mobile phone comprising a camera is capturing a scene, for example a football game, during recording the scene the user may watch the scene on the display of the video camera or mobile phone. The second capturing, device which is arranged adjacent to the display device such that it can detect and capture eye movements of the user, is used to capture the eye movements and based on the eye movements the trajectory data can be directly derived and stored together with the video data.

According to another embodiment, the moving visual images of recorded video data are displayed on a display device and the eye movement of the eye of the viewer is captured with a capturing device arranged adjacent to the display device while the viewer is viewing the visual images. In this case, an already recorded video data is played back on the display device and the viewer is watching the video. During watching the video the capturing device captures each eye movement of the viewer and based on the eye movements, trajectory data may be derived and assigned to the visual data as metadata. Thus, the more viewers are viewing the video data, the amount of trajectory data may be increased.

According to another aspect of the present invention, a user equipment is provided. The user equipment comprises a display device for displaying moving visual images and a capturing device for capturing an eye movement of an eye of a viewer viewing the moving visual images on the display device. Preferably, the capturing device is arranged adjacent to the display device. The user equipment comprises furthermore a processing device coupled to the display device and the capturing device. The processing device determines trajectory data based on the captured eye movement and assigns the trajectory data to video data. The video data comprises the moving visual images and the assigned trajectory data for example as metadata. The user equipment may be therefore configured to perform the above-described method and comprises therefore also the above-described advantages. Furthermore, the user equipment may comprise for example a mobile device, especially for example a notebook computer, a tablet computer, a video camera, a mobile telephone or a mobile media player.

Although specific features described in the above summary and the following detailed description are described in connection with specific embodiments and aspects of the present invention, it should be noted that the features of the embodiments and aspects may be combined with each other unless specifically noted otherwise.

BRIEF DESCRIPTION OF DRAWINGS

The present invention will now be described in more detail with reference to the accompanying drawings.

FIG. 1 shows schematically a user in connection with a user equipment according to an embodiment of the present invention.

FIG. 2 shows method steps of a method for generating trajectory data for video data according to an embodiment of the present invention.

FIG. 3 shows schematically trajectory data of a moving object.

FIG. 4 shows method steps of a method according to a further embodiment of the present invention.

FIG. 5 shows schematically the user controlling a playback of video data based on trajectory data determined according to an embodiment of the present invention.

DESCRIPTION OF EMBODIMENTS

In the following, exemplary embodiments of the invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

FIG. 1 shows schematically a user 10 looking at the user equipment 12, for example a mobile telephone, a tablet PC or a mobile media player. The user equipment 12 comprises a display 13 for displaying moving visual images of for example video data stored within the user equipment 12 or received from a server via for example a wireless communication. The user equipment 12 comprises furthermore a capturing device 14 for capturing an eye movement of an eye 11 of the user 10 viewing the moving visual images on the display 13. The capturing device 14 comprises for example a digital camera arranged adjacent to the display device 13 and directed such that the user 10 and especially the eyes 11 of the user 10 can be captured when the user 10 is looking at the display 13. Such a camera 14 may be provided at the user equipment 12 for other reasons, for example in case of a mobile telephone for establishing a video telephone call. The user equipment 12 comprises furthermore a processing device 15, for example a microprocessor, coupled to the display 13 and the camera 14. The processing device 15 may be adapted to perform the method steps described below in connection with FIG. 2.

FIG. 2 shows a method 20 comprising method steps 21-24 performed by the processing device 15. In step 21 the processing device 15 displays moving visual images of for example previously recorded video data or of video data which is currently captured by the user equipment 12 with a further capturing device on a back side of the user equipment 12, i.e., on an opposite side of the side on which the capturing device 14 and the display 13 are arranged. The moving visual images displayed on the display 13 may comprise for example a scene as shown in FIG. 3 in which an airplane 31 is flying along a clouded sky. During displaying the moving visual images of the airplane 31 flying along a route 32 to a further position indicated by airplane 31 in FIG. 3, an eye movement of the eye 11 of the user 10 is captured with the camera 14 in step 22. In step 23 trajectory data is determined based on the captured eye movement. The determined trajectory data correspond to the route 32 the airplane 31 has been travelling. In step 24 the determined trajectory data is assigned to the video data and stored together with the moving visual images. Thus, trajectory data of the airplane 31 may be determined without performing an image processing of the moving visual images.

As described above, there are two kinds of eye movements: saccade and smooth pursuit. When the airplane 31 is travelling along the route 32 and there are no clouds in the sky the user 10 may follow the airplane 31 across the sky with the smooth pursuit eye movement. The scan path determined from the eye movement may be smoothed using conventional methods, for example a Bezier method. The trajectory data of the moving object (the airplane 31) can be directly determined from the eye movement and used for for example manipulating a video as will be described in detail below. However, in case of the cloudy sky shown in FIG. 3, the airplane 31 may be obscured on its path 32 by a cloud 34. Nevertheless the user 10 may follow the airplane 31 across the sky. When the airplane passes through the cloud 34, the eyes 11 of the user 10 may either follow by means of a ballistic saccade to move the eyes to a position where the airplane is supposed to appear. As an alternative, the eyes may perform a smooth pursuit and follow the airplane 31 virtually through the cloud 34. In the first case (saccade movement) a first path until the airplane 31 is obscured by the cloud 34 and a second path after the airplane 31 has reappeared after passing the cloud 34, may be connected to form a single trajectory since they are along the same path 32. In the second case (smooth pursuit) the trajectory data can be directly determined from a smooth pursuit eye movement.

As described above, the trajectory data determined from the user's gaze path when looking at the video data is recorded as metadata along with the video data and may be used to find objects and paths that are most interesting in view of the user 10. Thus, a use of an object tracking algorithm based on processing the moving visual images can be completely avoided. However, even if an object tracking algorithm is implemented, the trajectory data determined as described above may help to reduce the complexity for such an object-tracking algorithm thus reducing the computational requirements. Furthermore, an object-tracking accuracy may be increased by combining information from an object-tracking algorithm with the trajectory metadata. This may help in cases in which the moving object changes its shape, for example if the moving object is a bird with flapping wings.

The trajectory metadata determined as described above may be used to control an application which is displaying the moving visual images. For example, in case the moving visual images are images of recorded video data being played back by a video playback application, a navigation within the video data may be accomplished based on the trajectory data. Navigation within the video data may comprise for example a temporal navigation through the video data like varying the playback speed or jumping or skipping through the video data.

Controlling a video playback will be described in more detail in connection with FIGS. 4 and 5. FIG. 4 shows a method 40 comprising method steps 41-45. Assuming the method 20 described above in connection with FIG. 2 has been performed on video data, the video data now comprises additional meta data indicating trajectory data based on eye movements of users who have watched the video data before. As shown in FIG. 5, two trajectories 32 and 52 of two air planes 31 and 51 have been determined based on eye movements of users who watched the video data and the trajectories have been stored as meta data in the video data. Now, in step 41 the moving visual images of the video data are played back on the display 13. The display 13 may comprise a touch-sensitive surface such that the processing device 15 may determine a position where the viewer touches the display 13 for example with a finger 53 (step 42). The processing device 15 compares the touch position of the finger 53 with the trajectory 32 and 52. Each trajectory data may comprise a plurality of position information over time. In the example shown in FIG. 5, the processing device 15 determines that the touch position of the finger 53 matches to the trajectory data 32 (step 43). Therefore, in steps 44 and 45 a playback of the video data may be controlled depending on further detected touch positions along the trajectory 32. For example, as long as the finger 53 is not moved, the video data playback is stalled. When the finger 53 is moved along the trajectory 32, the video data playback may be performed such that the airplane 31 is following along and together with the moving finger 53. In case the finger 53 is moved in a backward direction along the trajectory 32, the video data playback may be performed in a reverse direction.

Instead of a playback control, the trajectory data assigned to the video data may be used in other applications, for example in gaming applications incorporating augmented reality video data provided with the trajectory data which may be retrieved before or in real time by monitoring the eye movement.

Furthermore, instead of video data, the trajectory data may be assigned to a recording of a game or a user interface. In this case, the direct manipulation, e.g. by moving the finger along the display, may be used to control movements within the game or user interface. Technically the recording may comprise spatial positions stored in the game, and moving the finger is an input how the graphics of the game or user interface should move.

The above-described method for generating trajectory data based on eye movement, may also advantageously be used for video data comprising a lot of individually moving objects. For example, the video data may show a crowd of marathon runners running along the street. Object-tracking for each marathon runner may be time-consuming and computationally expensive. A user looking at the video data will follow only one or a very few runners and therefore trajectory data of objects in which the user is most interested may be determined with low effort based on the eye movement. The trajectory data based on the eye movement helps to radically reduce the work needed as only those objects and paths have to be analyzed in which the user seems to be most interested. Interest in a path or an object could be shown by both smooth pursuit and by switching between it and other objects using saccades. The reduced number of trajectories may furthermore ease the interaction for for example a playback control since it is avoided that the video data is assigned with dozens of overlapping paths for each object or runner of the crowd. Furthermore, as the user gaze will reveal which object or path is of most interest at the moment, it is possible to use this information to switch seamlessly between following different objects which will allow a smoother user interface to be implemented, for example for controlling playback.

The invention claimed is:

1. A method for generating trajectory data for video data, the method comprising:
   capturing an eye movement of an eye of a viewer viewing moving visual images with a capturing device,
   automatically determining the trajectory data based on the eye movement with a processing device, and
   automatically assigning the trajectory data to the video data comprising the moving visual images with a processing device.

2. The method according to claim 1, wherein the trajectory data comprises a plurality of position information over time, each position information relating to a position of a moving object represented by the moving visual images.

3. The method according to claim 1, further comprising:
   determining at least a first position information and a second position information of a pointing device guided by a user during playback of the video data, each position information indicating a corresponding position in the moving visual images,
   comparing the determined at least first and second position information with a plurality of position information of the trajectory data, and
   controlling a parameter of an application playing back the video data based on the comparison.

4. The method according to claim 3, wherein controlling the parameter comprises:
   adapting a playback speed for playing back the video data based on the comparison.

5. The method according to claim 1, further comprising:
   determining at least a first position information and a second position information of a pointing device guided by a user during playback of the video data, each position information indicating a corresponding position in the moving visual images,
   comparing the determined at least first and second position information with a plurality of position information of the trajectory data, and
   determining an object in the moving visual images based on the comparison.

6. The method according to claim 1, further comprising:
   determining a position of an object in the moving visual images by processing the moving visual images,
   comparing the position of the object with a plurality of position information of the trajectory data, and
   determining a trajectory of the object based on the comparison.

7. The method according to claim 1, wherein determining the eye movement comprises:
   determining a plurality of eye movements,
   determining for each of the plurality of eye movements if the eye movement is a smooth pursuit eye movement or a saccade eye movement, and
   in case the eye movement is a saccade eye movement:
     determining for each saccade eye movement an object located at a stop position of the corresponding saccade eye movement, and
     determining the trajectory data based on the plurality of saccade eye movements and related objects at the stop positions, and in case the eye movement is a smooth pursuit eye movement:
  determining the trajectory data based on trajectory data of a continuous movement of the smooth pursuit eye movement.

8. The method according to claim 1, wherein the step of capturing the eye movement comprises:
  capturing a scene in an environment with a first capturing device to generate the moving visual images,
  displaying the moving visual images on a display device during capturing,
  capturing the eye movement of the eye of the viewer viewing the moving visual images with a second capturing device arranged adjacent to the display device,
  generating the video data based on the captured moving visual images.

9. The method according to claim 1, wherein the step of capturing the eye movement comprises:
  displaying the moving visual images of recorded video data on a display device, and
  capturing the eye movement of the eye of the viewer viewing the moving visual images with a capturing device arranged adjacent to the display device.

10. A user equipment, comprising:
  a display device for displaying moving visual images,
  a capturing device for capturing an eye movement of an eye of a viewer viewing the moving visual images on the display device, and
  a processing device, configured to
    determine trajectory data based on the captured eye movement, and
    assign the trajectory data to video data comprising the moving visual images.

11. The user equipment according to claim 10, wherein the user equipment comprises a mobile device comprising at least one of a group comprising a notebook computer, a tablet computer, a video camera, a mobile telephone, and a mobile media player.

\* \* \* \* \*